(12) United States Patent
McGann et al.

(10) Patent No.: US 8,521,818 B2
(45) Date of Patent: Aug. 27, 2013

(54) METHODS AND APPARATUS FOR RECOGNIZING AND ACTING UPON USER INTENTIONS EXPRESSED IN ON-LINE CONVERSATIONS AND SIMILAR ENVIRONMENTS

(75) Inventors: Conor McGann, San Carlos, CA (US); Jeffrey Eric Davitz, Danville, CA (US)

(73) Assignee: Solariat, Inc., Danville, CA (US)

( * ) Notice: Subject to any disclaimer, the term of this patent is extended or adjusted under 35 U.S.C. 154(b) by 0 days.

(21) Appl. No.: 13/529,547

(22) Filed: Jun. 21, 2012

(65) Prior Publication Data

US 2012/0265819 A1 Oct. 18, 2012

Related U.S. Application Data

(63) Continuation-in-part of application No. 13/040,092, filed on Mar. 3, 2011, now Pat. No. 8,271,583, which is a continuation of application No. 12/851,489, filed on Aug. 5, 2010, now Pat. No. 7,921,156.

(51) Int. Cl.
*G06F 15/16* (2006.01)

(52) U.S. Cl.
USPC .......................................... 709/204; 709/207

(58) Field of Classification Search
USPC ................................. 709/204, 207
See application file for complete search history.

(56) References Cited

U.S. PATENT DOCUMENTS

| 7,428,504 | B2 | 9/2008 | Song |
| 7,478,089 | B2 | 1/2009 | Henkin et al. |
| 7,483,910 | B2 | 1/2009 | Beyer et al. |
| 7,523,087 | B1 | 4/2009 | Agarwal et al. |
| 7,555,722 | B2 | 6/2009 | Karatal et al. |
| 7,668,922 | B2 | 2/2010 | Garbow et al. |
| 7,680,882 | B2 | 3/2010 | Tiu, Jr. et al. |
| 7,702,798 | B2 | 4/2010 | Apreutesei et al. |
| 7,725,435 | B1 | 5/2010 | Li et al. |
| 7,730,021 | B1 | 6/2010 | Morse et al. |
| 7,739,594 | B2 | 6/2010 | Vasilik |
| 7,752,074 | B2 | 7/2010 | Bosarge et al. |
| 7,756,926 | B2 | 7/2010 | Tseng et al. |
| 7,769,764 | B2 | 8/2010 | Ramir et al. |
| 8,121,618 | B2 * | 2/2012 | Rhoads et al. ............. 455/456.1 |
| 2004/0059712 | A1 | 3/2004 | Dean et al. |
| 2005/0262428 | A1 | 11/2005 | Little et al. |
| 2006/0095502 | A1 | 5/2006 | Lewis et al. |
| 2006/0293949 | A1 | 12/2006 | Grossnickle et al. |
| 2007/0118801 | A1 | 5/2007 | Harshbarger et al. |
| 2007/0168465 | A1 | 7/2007 | Toppenberg et al. |

(Continued)

OTHER PUBLICATIONS

Anderson, Kenneth M. et al., "Templates and Queries in Contextual Hypermedia", Proc. 17th Conf. Hypertext and Hypermedia, pp. 99-110, Aug. 22-25, 2006, Odense, Denmark.

(Continued)

*Primary Examiner* — Kristie Shingles
(74) *Attorney, Agent, or Firm* — Fahmi, Sellers, Embert & Davitz

(57) ABSTRACT

Intentions of a user as expressed in an on-line conversation or other user generated content (UGC) are identified and subsequently acted upon, for example by bringing relevant or related content to the attention of the user and/or making others aware of the conversation. The intention signals derived from the UGC may be used to fashion or update a user profile or inform a broader view of the individual associated with the UGC.

23 Claims, 4 Drawing Sheets

(56) References Cited

U.S. PATENT DOCUMENTS

| | | |
|---|---|---|
| 2007/0244748 A1 | 10/2007 | Smith et al. |
| 2007/0271145 A1 | 11/2007 | Vest |
| 2008/0040318 A1 | 2/2008 | Stanis et al. |
| 2008/0052140 A1 | 2/2008 | Neal et al. |
| 2008/0065604 A1 | 3/2008 | Tiu et al. |
| 2008/0201434 A1 | 8/2008 | Holmes et al. |
| 2008/0214148 A1* | 9/2008 | Ramer et al. ............... 455/414.1 |
| 2008/0243797 A1 | 10/2008 | Song et al. |
| 2008/0306913 A1 | 12/2008 | Newman et al. |
| 2009/0150214 A1 | 6/2009 | Mohan |
| 2009/0150397 A1 | 6/2009 | Chen et al. |
| 2009/0204883 A1 | 8/2009 | Talanis et al. |
| 2009/0210806 A1 | 8/2009 | Dodson et al. |
| 2009/0222341 A1 | 9/2009 | Belwadi et al. |
| 2009/0235150 A1 | 9/2009 | Berry |
| 2009/0248672 A1 | 10/2009 | McIntire et al. |
| 2010/0042635 A1 | 2/2010 | Venkataramanujam |
| 2010/0088182 A1 | 4/2010 | Ryder et al. |
| 2010/0115615 A1 | 5/2010 | Hubbard et al. |
| 2010/0153284 A1 | 6/2010 | Hoag et al. |
| 2010/0159883 A1 | 6/2010 | Pascal et al. |
| 2010/0191811 A1 | 7/2010 | Han et al. |
| 2011/0098056 A1* | 4/2011 | Rhoads et al. ............. 455/456.1 |
| 2011/0161076 A1* | 6/2011 | Davis et al. .................... 704/231 |
| 2011/0231242 A1 | 9/2011 | Dilling et al. |

OTHER PUBLICATIONS

Brusilovsky, Peter, "Adaptive Hypermedia", User Modeling and User-Adapted Interaction, vol. 11: pp. 87-110, 2001.

Hansen, Klaus Marius & Damm, Christian Heide, "Instant Collaboration: Using Context-Aware Instant Messaging for Session Management in Distributed Collaboration Tools", Proc. 2nd Nordic Conf. Human-Computer Interaction, vol. 31, pp. 279-282, Oct. 2002, Arhus, Denmark.

* cited by examiner

METHODS AND APPARATUS FOR RECOGNIZING AND ACTING UPON USER INTENTIONS EXPRESSED IN ON-LINE CONVERSATIONS AND SIMILAR ENVIRONMENTS

RELATED APPLICATIONS

This is a CONTINUATION-IN-PART of U.S. patent application Ser. No. 13/040,092, filed Mar. 3, 2011, now U.S. Pat. No. 8,271,583, which is a CONTINUATION of U.S. patent application Ser. No. 12/851,489, filed Aug. 5, 2010, now U.S. Pat. No. 7,921,156, each of which is assigned to the assignee of the present invention and incorporated herein by reference.

FIELD OF THE INVENTION

The present invention relates to methods and systems for recognizing intentions of a user as expressed in an on-line conversation or similar environment, and subsequently acting upon same, for example by bringing relevant or related content to the attention of the user and/or making others aware of the conversation.

BACKGROUND

The World Wide Web (WWW) or simply, the "Web" is the well-known collection of interlinked hypertext documents hosted at a vast number of computer resources ("hosts") communicatively coupled to one another over networks of computer networks known as the Internet. These documents, which may include text, multimedia files and images, are typically viewed as web pages with the aid of a web browser—a software application running on a user's computer system. Collections of related web pages that can be addressed relative to a common uniform resource locator (URL) are known as websites, and are typically hosted on one or more web servers accessible via the Internet.

In recent years, websites featuring user-generated content (UGC), that is content created and posted to websites by end-users, have become increasingly popular. UGC accounts for a wide variety of content, including news, gossip, audio-video productions, photography and social commentary, to name but a few. Content of this sort may be presented in any of a variety of forms, including web logs (blogs), comments regarding website editor-created content (e.g., user reviews of products being offered for sale at a website), status updates on social networking sites, and question and answer databases commonly known as forums.

Advertisers were quick to recognize the potential power of the Web as it concerns access to potential consumers of goods and services. Models for capitalizing on the insertion of advertisements into websites quickly sprang up. Such advertisements came in various forms, including banner ads, which appear across portions of a web page, and sponsored links, which typically appear in designated sections of search result pages. However, many Web users find such advertisements to be annoying in that they are often placed in locations of a web page that interrupt the user's reading or interaction with content on the page, are contextually irrelevant, and/or are otherwise disruptive of the web browsing experience. The situation is compounded when dealing with websites featuring UGC because contributors to such sites often have a low tolerance for advertisements on the sites that are perceived as not relevant to the content. At the same time, advertising is one of the primary ways in which website operators offset the cost of producing content and otherwise maintaining websites.

SUMMARY OF THE INVENTION

In various embodiments, the present invention provides systems and methods for recognizing intentions of a user as expressed in an on-line conversation or other UGC and subsequently acting upon same, for example by bringing relevant or related content to the attention of the user and/or making others aware of the conversation. In addition, the present methods and systems may be used to integrate intention signals of a user derived from an on-line conversation or posting with a profile of that individual to inform a broader view of the individual.

In one embodiment of the invention, an intention type and intention topic of an utterance contained within the UGC is determined and, on the basis of the intention type and intention topic, one or more possible actions to be taken are selected. These possible actions may be scored, for example according to an assessment of actionability of the UGC, and various ones of the actions taken or not taken according to their respective scores. Among the possible actions which may be taken are: presenting candidate creatives via the social media platform at which the UGC was posted, informing one or more others of the UGC; and updating a user profile to account for the intention type and topic. In some instances, the intention type may be identified on the basis of features extracted from the utterance and the intention topic may be identified on the basis of scored n-grams obtained from the utterance. Such n-grams may be scored using rules applicable to the identified intention type.

These and other examples of the features and uses of the present invention are described further below.

BRIEF DESCRIPTION OF THE DRAWINGS

The present invention is illustrated by way of example, and not limitation, in the figures of the accompanying drawings in which.

DETAILED DESCRIPTION

Described herein are methods and systems for recognizing intentions of a user as expressed in an on-line conversation or other UGC hosted on a social media or other website, or an instant message (IM) or similar conversation, Twitter™ tweets, social network page commentary, e-mail threads, forum-hosted discussion boards, etc., or similar environment, e.g., individual postings to social networking sites, blogs, tweets, etc., and subsequently acting upon same, for example by bringing relevant or related content to the attention of the user and/or making others aware of the conversation. Alternatively, or in addition, the present methods and systems may be used to integrate intention signals of a user derived from an on-line conversation or posting with a profile of that individual, to inform a broader view of the individual. Such profiles may be constructed from a variety of sources, including but not limited to information derived from past conversations and/or posting, self-expressed social networking profiles, etc. When used as a means of determining advertising to present to users, the present methods and systems may yield advertisement click-through rates that are at least an order of magnitude better than those observed with conventional on-line advertising, e.g., as practiced using banners, pop-ups, and other forms of advertisements that are supposedly tailored to particular users.

Figure 1:
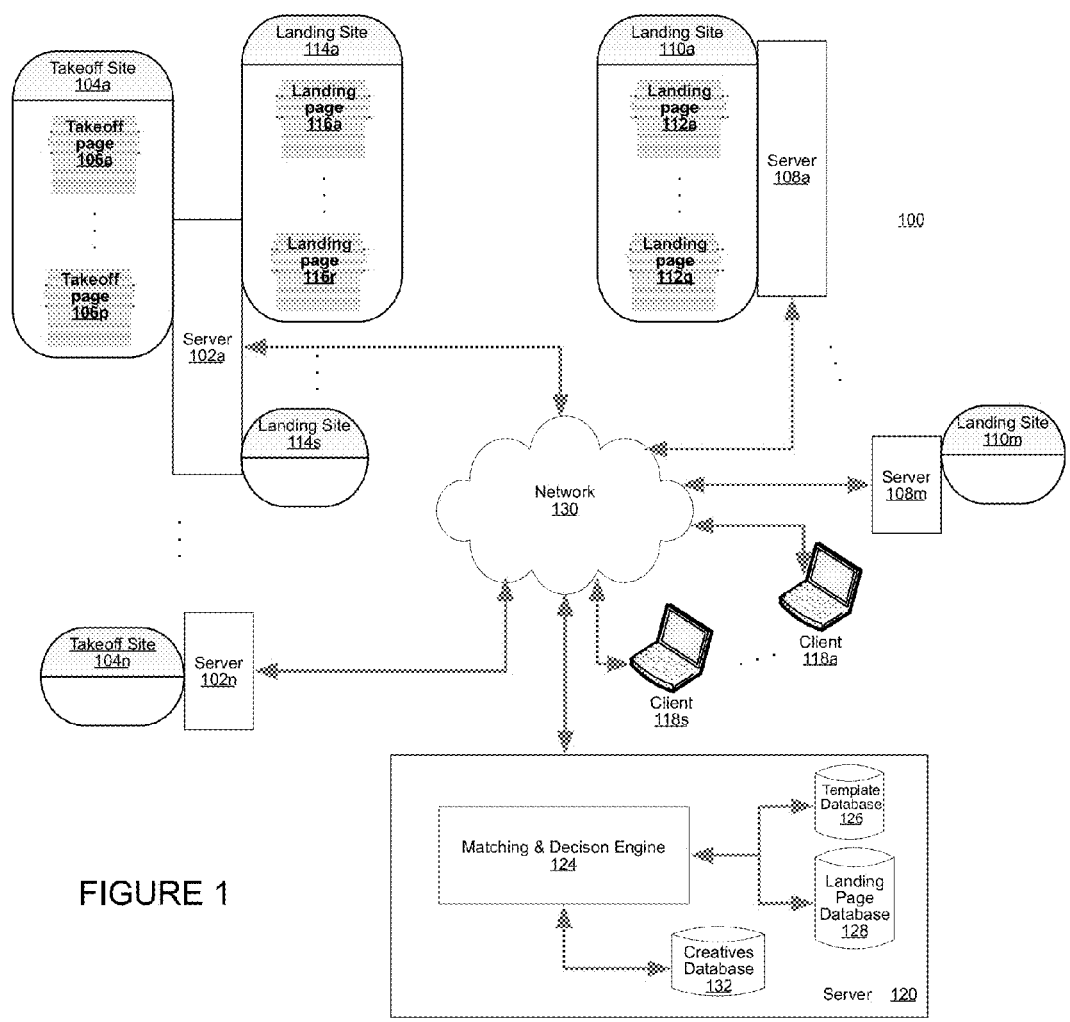
FIG. 1 illustrates components of a network in which embodiments of the present invention may be implemented.

To better understand the environment within which the present methods and systems operate, consider the network 100 illustrated in FIG. 1. Included in this network are various servers 102a-102n, each hosting one or more takeoff sites 104a-104n. Each takeoff site 104 may include one or more takeoff pages 106a-106p. The takeoff sites may be social media sites in which users are engaged in some sort of on-line social conversation with other users, but may also be any sites at which UGC is posted (e.g., in the form of an on-line conversation or otherwise). Hence, the takeoff pages may be forum pages, blogs, social network sites, chat windows, product or other review pages, audio/video hosting sites, photo sharing sites, etc.

Also part of network 100 are a number of servers 108a-108m, hosting landing sites 110a-110m, any or each of which may be made up of a plurality of landing pages 112a-112q. Notice that a server 102 hosting a takeoff site 104 with one or more takeoff pages 106 may also host one or more landing sites 114a-114s, any or each of which may include one or more landing pages 116a-116r. That is, any server may host any combination of takeoff and/or landing sites. When we refer to content on a takeoff site or landing site, we mean to include content that is located on a particular takeoff page of a takeoff site or landing page of a landing site, as appropriate.

The takeoff and landing sites are accessed by users via client systems 118a-118s. The client systems may, in some cases, be computer systems, such as personal computers or the like, but more generally may be any computer-based or processor-based device that executes application software which allows the content of the takeoff/landing site to be rendered for display to the user on a display device. For example, client systems may include computer systems, mobile devices such as iPads™, smart phones, mobile phones, etc., and the application software may be web browser software such as Microsoft Corporation's Internet Explorer™, Apple Inc.'s Safari™, or Google Inc.'s Chrome™, or instant messaging software such as Apple Inc.'s iChat™, America Online Inc.'s AIM™, etc. In some instances, dedicated applications (or "apps") running on mobile computing platforms (such as tablet computers, smart phones, etc.) may be employed. Such apps often provide improved user experiences in the context of associated web sites and portals than those afforded through the use of web browser applications as they make use of dedicated application programming interfaces (APIs) for the associated websites. Any or all of the above-described applications are typically stored in one or more computer readable storage devices accessible to one or more processors of the subject client system and, when executed, cause the processor(s) to perform the operations necessary to render the subject sites/pages for display at the subject system (e.g., via a display device communicatively coupled to the processor). The various constituents of network 100 are communicatively coupled to one another via one or more computer/data networks 130, which may include the Internet and other networks coupled thereto. The precise nature of network 130 is not critical to the present invention.

Network 100 also includes server 120, which hosts a matching and decision engine 124. The matching and decision engine implements an embodiment of the present invention, however, in other embodiments the function of this engine may be instantiated in multiple distributed entities. Accordingly, the embodiment illustrated in FIG. 1 should be regarded as merely a convenient example for purposes of the following discussion and not as a limitation of the present invention.

Matching and decision engine 124 is configured for the automatic detection of UGC at a subject takeoff site 104 and the subsequent automated determination of any actionable user intention (with respect to a product or service, for example) expressed within that UGC. That determination of user intention may then trigger one or more actions, including bringing the UGC (which may be a conversation or a solitary posting) to the attention of others (e.g., other users, an advertiser or the advertiser's proxy, or combinations thereof), replying to the UGC (e.g., with one or more links to content deemed to be relevant to the subject of the UGC and/or to the user), and/or integrating this intention signal with other information known about the user in a user profile, which itself may form one basis for subsequent advertisements or other content directed at the user.

In one example, the actionable intention may be the recognition of a need of the user, e.g., a need for a particular product or service, or perhaps a need for information concerning a particular subject. The matching and decision engine 124 may determine a set (and here a set may be one or more) of candidate creatives to present to the user by way of insertion into the on-line conversation present on the takeoff site. These creatives may serve as attractive lures, inducing the user and/or others engaged in the conversation hyperlinks included in the creatives) material present on one or more of the landing site(s) that is relevant to the conversation on the takeoff site. In some cases the creatives, including their associated links to the landing sites, may be advertisements ("ads"), but other forms of creatives may also be used. In some instances, the selection of the one or more creatives to present within the conversation may be an entirely automated process, while in other cases human editors may filter a group of creatives proposed by the matching and decision engine 124 to select one or more creatives deemed well suited for presentation in the context of the conversation.

Creatives may be fashioned using templates and, in one embodiment of the invention, a library of templates is stored in and obtained from a templates database 126, which is communicatively coupled to the matching and decision engine. This templates database may be hosted at the same or a different server than the matching and decision engine. A separate (or common) database 128 of landing page URLs is also maintained (either at server 120 or another server) and is likewise communicatively coupled and accessible to the matching and decision engine 124. Candidate landing pages may be obtained by receiving a content feed, making an API call or performing a crawl of one or more landing sites and the candidate creatives may be generated either by hand or by a set of heuristics based on textual analysis of the respective takeoff and landing sites.

Matching and decision engine 124 may be configured to provide not just a single "best" matching creative for a subject posting or other UGC element received or obtained from an on-line conversation (and here a conversation may be simply a posting by a single individual and not a two- or multi-way dialog among two or more individuals). Instead, in some cases, the matching and decision engine may be configured to provide a number of creatives deemed relevant to a point in the conversation (e.g., responsive to the actionable intention determined to exist within a posting or an entire thread). Thus the matching and decision engine may deliver one or more creatives assessed to be the most suitable from an available pool of creatives (including, in some cases, creatives that are established or created in real time in response to the UGC). In some cases, no creative will be delivered, for example where the matching and decision engine fails to identify a truly actionable intention or where an actionable intention is identified but is deemed not to be suitable for response by way of delivering a creative. These assessments involve determining an intention type and topic (e.g., to at least a predetermined confidence level), evaluating the actionability of the intention topic and selecting one or more creatives for presentation (and/or deciding not to present a creative), for example on the basis of relevance scores of the creatives computed with respect to the determined intention type and topic.

Figure 2:
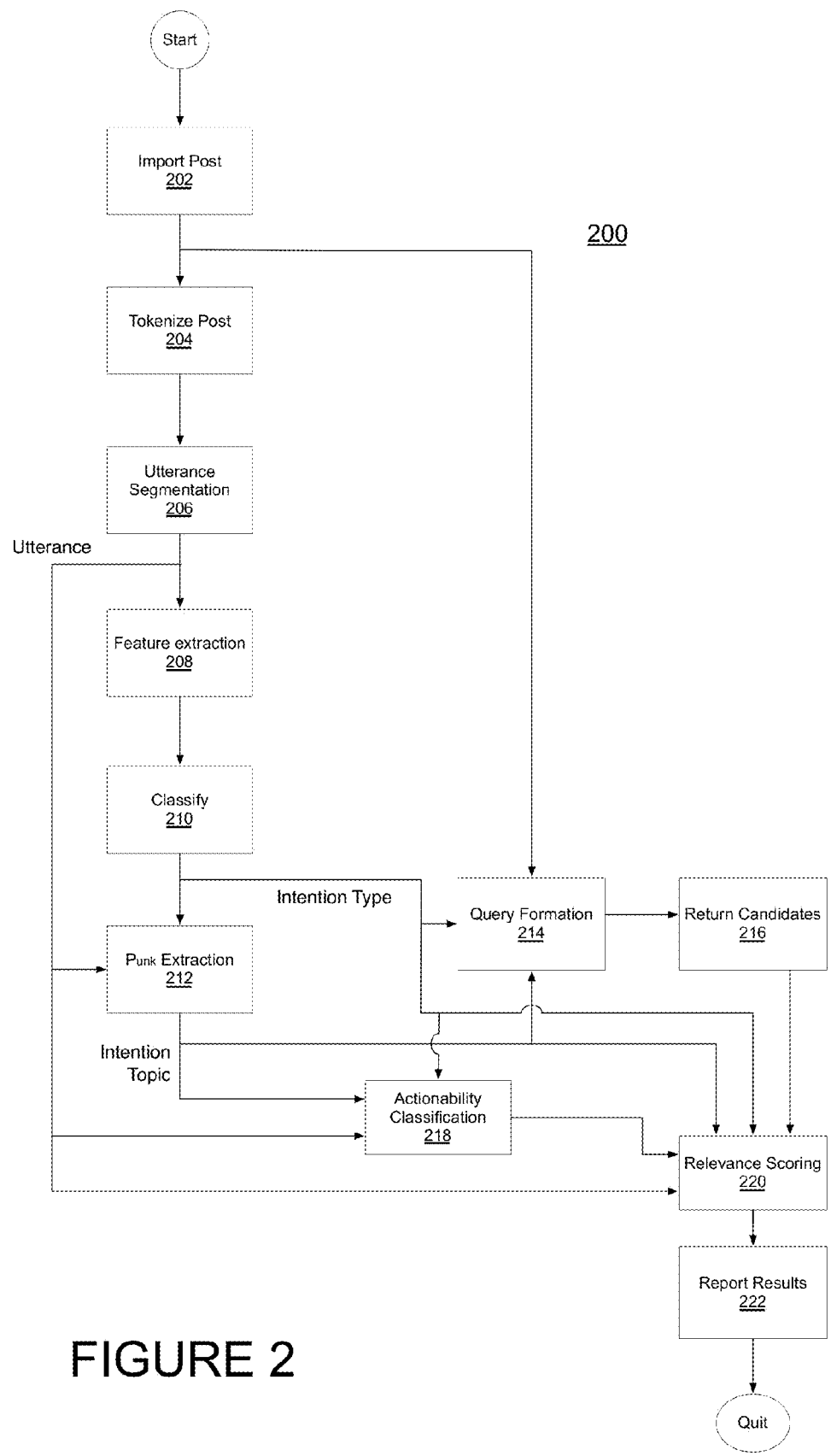
FIG. 2 illustrates an example of a process for determining creatives for insertion within a conversation in accordance with embodiments of the present invention.

FIG. 2 illustrates aspects of an assessment process 200 for determining an actionable intention from UGC and selecting one or more creatives in response thereto. Note that this illustration is intended only as one example of an implementation of the present invention and should not be viewed as the sole means for same. In other embodiments, steps in process 200 may be performed in parallel and/or in different sequences for matters of convenience or to take advantage of distributed or increased processing capacity and resources. Further, selecting and delivering creatives is but one form of action which can be performed in response to determining an actionable intention in UGC and the present invention may also be used in conjunction with actions such as alerting others to the existence and/or content of the UGC, and updating user profiles on the basis of the determined actionable intention.

Process 200 begins with a post being received 202 at, or harvested by, server 120. By "post" we mean any form of UGC, including but not limited to, posts or updates to a social media site (whether as part of a multi-participant conversation or otherwise), tweets, postings on blogs, forums, and the like, comments made at third party web sites, etc. The posts may be received and/or harvested in real time and/or in accordance with a schedule determined by an operator of server 120 and/or customers of such operator.

Once obtained, the post is tokenized 204. Tokenizing breaks the string of text that makes up the post into words, phrases, symbols, or other meaningful elements (tokens). This can be regarded as segregating the post into "words", however, the term words should be read broadly and is not intended to indicate that all tokens are actually equivalent to the familiar linguistic units commonly understood as words.

Once tokenized, the post is subjected to utterance segmentation 206. In this step, the various phrases in a post are divided up into discrete utterances (also known as speech acts). For example, a post such as:

"My dog won best in show today! He beat out several others. I must remember to stop at the store and pick up his favorite dog food as a reward."

may be divided into several utterances, as follows:

"My dog won best in show today!"
"He beat out several others."
"I must remember to stop at the store and pick up his favorite dog food as a reward."

In one embodiment, utterances are determined and segmented based upon the presence of punctuation marks commonly employed with sentence construction (e.g., periods, question marks, exclamation points, etc.). In other examples, single sentences may be segmented into more than one utterance (e.g., based on the presence of one or more demarcation features). Utterances may include questions, assertions, complaints, requests for action, and so on.

Utterance segmentation is not mandatory, but it is preferred. Some posts may contain multiple different thoughts, expressions, etc., and so trying to determine an appropriate set of one or more creatives for response can be difficult unless the post is segmented into utterances. By segmenting a post into utterances, better overall results (in terms of the quality of the creative(s) delivered to the user making the post) can be achieved.

Once the post has been segmented into utterances (if such segmentation is employed), feature extraction 208 can take place. Feature extraction may be accomplished using machine learning, heuristics or other techniques to represent the utterance in vector form. In one example, we use a bag of words representation model whereby each position in the vector is associated with a word token and the value at a given position in the vector represents the importance of the associated token within the utterance. Importance can be measured in several different ways, including, but not limited to:

A. term frequency (tf): e.g., the number of times that the word token appears in the utterance; or
B. tf-idf: term frequency multiplied by the inverse document frequency (i.e., the inverse of the rate of occurrence of the term across all documents in the corpus at hand, e.g., the subject UGC).

When generating the vector representation of a given utterance, a service provider may choose to weight word tokens within a post title more strongly than words that occur in the post body. It is also often advisable to use normalized vectors when generating similarity scores between vectors.

The output of the feature extraction process is a feature vector, which is applied as an input to a classifier 210. The classifier examines the feature vector to produce an intention type according to various rule sets. Intention types (which are determined on a per-utterance basis) may include questions, needs, problems, likes/dislikes, check-ins, etc.

Once the intention type information is determined, the utterance undergoes $P_{unk}$ extration 212 to determine intention topics. $P_{unk}$ is a shorthand expression for a measure of confidence that the extracted topic the actual topic of interest, for example a key noun phrase. $P_{unk}$ extraction is a linguistics-based approach (rather than a pure keyword matching with sliding window technique) to identifying key noun phrases in the utterances. These key noun phrases are deemed to be the topic of the intention expressed in the utterance. For example, in the utterance, "I want stickers for my laptop", the specified intention (or intention type) is an expression of desire (want), and the topic of that expressed desire is stickers (not a laptop). A keyword-based approach may have difficulty distinguishing between the stickers or the laptop as the true intention topic of the utterance. By relying on a linguistics-based approach rather than a mere keyword-based approach, however, the present method ensures that the true intention topic (stickers) is correctly identified more often than not.

Figure 3:
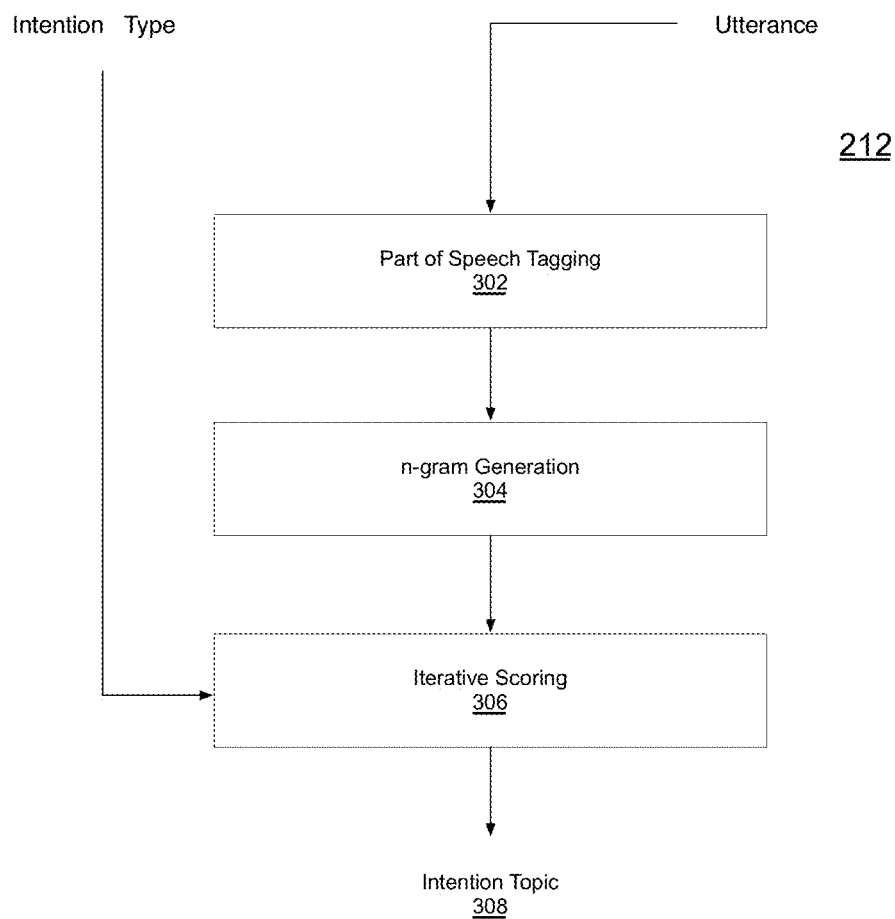
FIG. 3 illustrates an example of a process for determining intention topics of utterances in accordance with embodiments of the present invention.

The $P_{unk}$ extraction process 212 is discussed in greater detail with reference to FIG. 3. The utterance is provided to a tagging process 302 in which parts of speech elements in the utterance are tagged. The tagged utterance is then analyzed for n-grams 304. This involves using the identified noun phrases as anchor points and generating the n-grams around the noun phrases. The n-grams may be uni-grams, bi-grams, tri-grams or more complex structures. Generally, longer n-grams provide better results than shorter n-grams. The n-gram generation is performed independent of any influence by intention type and is a purely linguistic analysis. The result of the n-gram generation is a list of possible intention topics. These possible topics are then scored, according to intention type, in an iterative process 306, the output of which is that one of the possible intention topics is deemed to be the most likely intention topic 308 for the subject utterance.

Using n-grams, as opposed to simply using uni-grams, expands the list of possible intention topics from that which it might otherwise include. For example, in the utterance, "I want a laptop bag", if only uni-grams were considered then the possible intention topics might be "laptop" or "bag". If actions (such as the delivery of advertisements concerning either a laptop or a bag, but not specifically a bag for a laptop) were returned in response to this utterance, it is highly likely the actions would lead to unsatisfactory outcomes or be meaningless (e.g., the advertisements likely would be ignored because they would not be relevant to the true intention topic, the "laptop bag").

The scoring procedure may start with heuristics-based scoring of the n-grams produced during the n-gram generation. Then, the intention type information from the classifier can be leveraged to refine the score. For example, by knowing the intention type of an utterance, a defined rule set for the subject utterance can be employed to identify and match common word patterns (at the level of parts of speech) for that intention type as a way to boost the scores of certain n-grams. Consider for example an utterance such as, "I need a bag." This is an expression of a need (the intention type) and commonly, for such intention types, the word or phrase (more generally, the n-gram) immediately following the verb that expresses the intention type will be the topic of the intention. This is an example of a proximity rule for this intention type. Other rules for this intention type and rules for other intention types may be employed to score each possible intention topic n-gram and the n-gram with the highest score may be determined to be the best or most likely intention topic 308 for the utterance.

Returning to FIG. 2, the intention type and intention topic along with the original post are provided to a query formulation process 214. Here, a search is developed and made for possible creatives to return in response to the post. The search may be performed against a database of creatives, such as database 132, and the output will be a set of candidate creatives 216. In cases where action(s) other than the return of creatives is desired, a search may be made over databases including the relevant items appropriate for the desired action (s). For example, where one desired action is transmission of an alert to one or more persons, the search may be made over one or more databases including profiles of individuals to be notified in the event specified intention types/topics are identified.

In parallel, the intention type, topic and original post are provided to an actionability classification procedure 218 to determine whether or not the intention topic is actionable. By actionable we mean an intention topic that is worthy of taking action, or for which it is permissible to do so (e.g., in the form of returning an advertisement, etc.). The actionability determination is then used to assist in scoring 220 the candidate creatives according to their relevance. The result(s) is (are) reported 222 as matches—i.e., the creative(s) (advertisement (s)) deemed most relevant to the original post, as measured by its (their) relevance to the intention topic of that post.

The present process of determining matching creatives for a subject post thus involves much more than merely determining sentiment (as is done in other processes). Understanding sentiment alone is typically an insufficient basis on which to take action (e.g., by responding with a creative). For example, sentiment may reveal information about a like or dislike of a person making a post, but it (alone) says nothing about that individual's needs, wants, check-ins (e.g., location-based intentions), etc. Stated differently, sentiment is not the same as actionable intention information.

Figure 4:
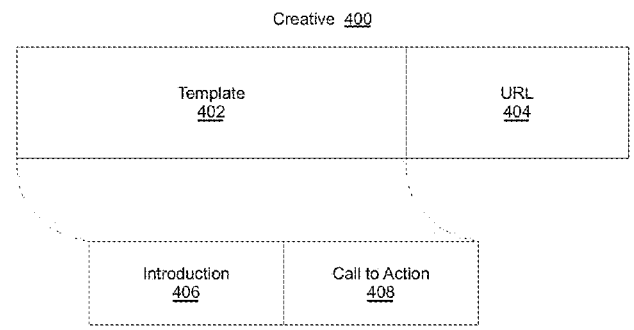
FIG. 4 illustrates an example of a creative for insertion in a conversation in accordance with embodiments of the present invention.

To ensure a high probability of success (e.g., success being measured by a recipient acting upon a creative returned in response to a post), creatives are not purely arbitrary sentences; they are designed to have a structure tailored to the context of the conversation in which they are to be inserted. As illustrated in FIG. 4, a creative 400 may be thought of as consisting of "slots", including a slot 402 for a template and another slot 404 for a URL (or other direction aiding material) to the landing site/page. The templates 402 may be made up of an introduction 406, which is intended to identify the reason and source of message, e.g., "for more information about x, y, z, . . . ", or "We at company x believe that you can get valuable sources of help at . . . "; and a call to action 408, which invites the user to do something. The minimal form of such an invitation may be to click on a link (i.e., to select a link to the landing site by executing a mouse click while the screen cursor displayed on a client system is indicating the URL portion of the creative), but the call to action can go beyond this to some form of cognitive action like learn, study, understand, see, etc.

The entries or content for each slot of a creative may be derived from background knowledge or experience of an operator or administrator of an ad-insertion service that operates server 120 (e.g., an advertising professional who might have developed certain kinds of preferred introductions for different situations) as well as content gleaned automatically from the takeoff and landing sites or related domain content (e.g., Wikipedia™ content regarding a particular subject or content from similar conversations). Concepts (or themes) are sets of words that express some fundamental meaning of the domain, e.g., when discussing automobiles, the term "sports utility vehicle" has a certain connotation, and such concepts can be entities or properties of entities, such as "SSRI side effects", or user intentions like "great value deal". The introduction will tend to be the template component that contains references to such concepts, e.g., "for information about SSRI side effects, . . . ", while the call to action will tend to reference the user cognitive action to be taken and a landing page address. Of course, template slots other than just introductions and calls to action may also be present in the templates and, if present, these too would be populated when creating the templates database. For example, a slot called "conversational reference", which can contain references to content or properties of the conversation, may be employed. Or, some templates may have two possible calls to action, e.g., "do x OR do y". The full set of creatives is, therefore, the set of all possible compositions of the elements from each of the slots.

In accordance with the present invention, the template and landing page databases 126, 128 may be populated on an on-going basis and used to formulate the creative(s). In the case of the templates database 126, this involves populating each of the introduction and call to action slots with candidates and storing the results. That is, server 120 (e.g., the matching and decision engine or a separate template creation engine (not shown in detail)) may automatically create all possible combinations of introductions and calls to action (the product of the two) and store these combinations in template database 126. For the landing page database, a crawl, an API call or other content gathering means may be employed to populate database 128. The full inventory of possible creatives may then be created by appending all possible landing page URLs from the landing page database to each template from the template database and storing the results in a creative database 132. Creatives may be created in advance and/or real time (or quasi-real time), for example in response to a trigger. Once the various databases have been populated (assuming they are used), the above-described matching process in order to determine candidate creatives to be presented to a user on a takeoff page may be employed.

By analyzing the contents of sites such as web pages, forums and other forms of social media then, systems configured in accordance with the present invention are able to determine actionable intentions of users of the sites and recommend or even take contextually relevant actions (such as, for example, inserting links and associated text at appropriate points in a conversation, directing users to other on-line material that may be helpful to them, alerting others to the existence and/or content of the conversation, updating or constructing user profiles, etc.). To maximize the relevance of these actions to users, these systems are preferably designed to detect and respond to important conversational indicators, such as particular intention types and topics expressed within an online posting. By matching the intention type and topics presented by an author against a set of potential actions, the present systems can select and take those actions most relevant to the authored post. For example, a query directive could be linked to content that provides either a direct answer to the question being asked, or to other material that may be helpful. In other instances, a number of links to content whose tenor, tone and meaning are determined to be relevant (and perhaps useful) in the context of the conversation may be presented.

In the discussion above we use the term "creative" to designate that portion of the content being inserted into the conversation which is intended for presentation to the conversation participants and/or others (i.e., intended to be viewed by them), but this should not be read as restricting the present invention solely to means for inserting commercial content. By creatives, we mean a broader construct, which may include some combination of links or other direction-aiding materials, text, audio and/or visual elements. Creatives may be portions of larger constructs, which we refer to as "payloads". A payload may include content in addition to a creative, which other content is not itself intended for display to conversation participants or others, but which may be used to direct placement of the creative within a takeoff page, to gather statistics from the takeoff page, or provide for or perform another function. For example, a payload may include computer-readable instructions or computer-interpretable tags or other information. In some instances, a creative will be the sole constituent of a payload, but this is not necessarily so.

The location(s) at which the creatives are presented (which is, generally, also the location at which the conversation is taking place) is referred to as a "takeoff site", and the location(s) to which users are directed when they click on one of the links (or follow the direction-aiding materials) is referred to as a "landing site", but this should not be read as restricting the present invention solely to websites. In the context of takeoff and landing sites, the term site is intended to encompass, respectively, any environment where conversations may occur and any environment to which the conversation participants (or others reading the conversation) might be directed.

Takeoff sites include takeoff pages, at which individual conversations, or portions thereof, may be displayed, instantiated or presented. Landing sites include landing pages at which the content deemed to be of interest to the conversation participants (or others reading the conversation) may be hosted or otherwise made accessible. Thus, while a takeoff site is typically a social media site at which users are engaged in some sort of network-enabled social conversation with one or more other users, this need not necessarily be the case and the term may also encompass software applications in which conversations are hosted as well as IM threads, etc. Likewise, landing sites can consist of either other on-line conversations on social media sites (including, but not limited to, the same site as the takeoff site) or sites containing curated content, but may also be software applications, IM threads, etc. The aim is to enrich a user's social media experience, and also enhance the value of curated content and existing conversational threads, by providing users with natural entry points to new conversations that key off important elements of a conversation which they are already viewing or engaging in.

If creatives are to be provided for display, the decision and matching engine passes the creatives (or links to same) to the subject takeoff site, where the creatives are displayed near (i.e., in a contextually relevant location for) the original post. For example, the creatives may be displayed next in order in the conversation thread or may be displayed alongside the conversation thread so as not to be disruptive thereto. This may be accomplished through the use of instructions included with the creative in the payload, code injected into the takeoff page, or by code in a software application, which code or instructions direct the placement of the creatives from server 120.

The present invention thus determines for a given message (or group of messages) in a conversation (e.g., an on-line conversation presented at a takeoff page), one or more contextually meangingful creatives (and suitable landing page(s)) whose contents, taken together, are relevant for the contents of that message (or group of messages). If there is a sufficiently strong match, that creative and the URL of the landing page (or links to same) are provided for display on the takeoff page (e.g., in a contextually relevant location with respect to the takeoff message), thereby providing a recommendation to the people engaged in or monitoring the conversation of additional content that can enhance their conversational experience.

The matching procedure described above provides a method for selecting relevant creatives based on textual data available from the takeoff page(s), templates and landing page(s). This process may be enhanced to take into account other information, for example feedback available from usage logs that track user interaction with the creatives, such as mouseovers or clicks, and/or subsquent user actions, such as product purchases or page visits within a landing site. That is, an adaptive component which takes into account user behavior can be added to the above-described matching procedure by, for example, altering the score of a given landing page depending on the clickthrough response a creative has received in the past, user behavior at the landing site, or other user behavior of interest.

The foregoing discussion highlights the ability of the present system to provide system operators with "conversational strategies"—that is, strategies for content insertions in conversations. For example, recall that in the construction of a creative there are a number of "slots" that can be filled. If we regard the "theme" as one such slot, then for a fixed theme, the content of the other creative slots can be permitted to vary and the set of results will be thematically invariant, but otherwise distinct creatives. Different ones of these creatives can then be used within one or more conversational contexts and the results monitored to determine which is the best set of creative content for the defined theme. Stated differently, the present infrastructure allows a determination of a solution to the question, which creative content is best for a given theme.

Other problem constructs may involve determining the best time to insert a creative into a conversation. For example, analysis of the results of inserting creatives into conversations of varying conversational velocity (or into one conversation under conditions of different conversational velocity) may reveal information that allows service providers to chose optimum or near optimum times to insert future creatives so as to maximize the likelihood that URLs associated with those creatives will be selected by participants in the conversation.

The sum of the results from these kinds of learning instances (facilitated by the above-described infrastructure) gives rise to conversational strategies. Stated differently, the present invention provides means for determining what theme to match with what creative content, when best to insert creatives in a conversation, and a host of other information relative to deciding which content to insert in which conversations and when.

Figure 5A:
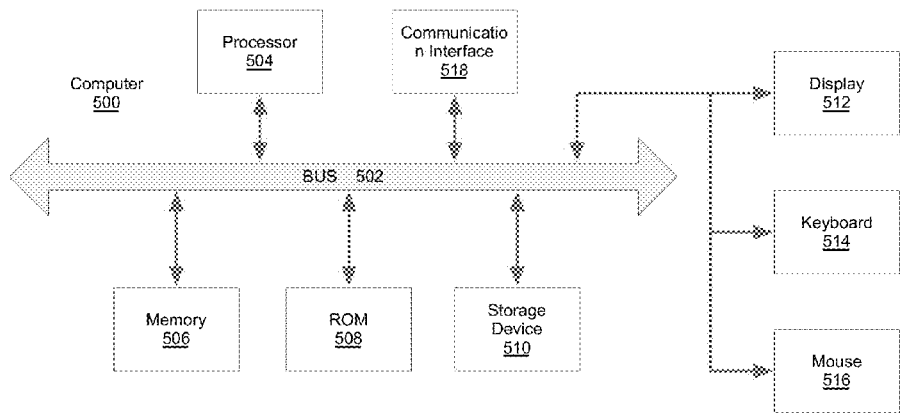
FIG. 5A illustrates components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 5A provides an example of a computer system 500 that is representative of any of the servers or client systems discussed herein. Note, not all of the various computer systems may have all of the features of computer system 500. For example, certain of the servers discussed above may not include a display inasmuch as the display function may be provided by a client computer communicatively coupled to the server. Such details are not critical to the present invention. Computer systems such as computer system 500 may be referred to by other names, for example as hand-held devices, mobile devices, smart phones, multiprocessor systems, microprocessor-based electronic devices, digital signal processor-based devices, networked computer systems, minicomputers, mainframe computers, personal computers, servers, laptop computers, tablet computers, and the like. Such labels are not critical to the present invention.

Computer system 500 includes a bus 502 or other communication mechanism for communicating information, and a processor 504 coupled with the bus 502 for processing information. Computer system 500 also includes a main memory 506, such as a random access memory (RAM) or other dynamic storage device, coupled to the bus 502 for storing information and instructions to be executed by processor 504. Main memory 506 also may be used for storing temporary variables or other intermediate information during execution of instructions to be executed by processor 504. Computer system 500 further includes a read only memory (ROM) 408 or other static storage device coupled to the bus 502 for storing static information and instructions for the processor 504. A storage device 510, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 504 can read, is provided and coupled to the bus 502 for storing information and instructions (e.g., operating systems, applications programs and the like).

Computer system 500 may be coupled via the bus 502 to a display 512, such as a flat panel display, for displaying information to a computer user. An input device 514, such as a keyboard including alphanumeric and other keys, is coupled to the bus 502 for communicating information and command selections to the processor 504. Another type of user input device is cursor control device 516, such as a mouse, a trackball, or cursor direction keys for communicating direction information and command selections to processor 504 and for controlling cursor movement on the display 512. Other user interface devices, such as microphones, speakers, etc. are not shown in detail but may be involved with the receipt of user input and/or presentation of output.

The processes referred to herein may be implemented by processor 504 executing appropriate sequences of computer-readable instructions contained in main memory 506. Such instructions may be read into main memory 506 from another computer-readable medium, such as storage device 510, and execution of the sequences of instructions contained in the main memory 506 causes the processor 504 to perform the associated actions. In alternative embodiments, hard-wired circuitry or firmware-controlled processing units (e.g., field programmable gate arrays) may be used in place of or in combination with processor 504 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

Computer system 500 also includes a communication interface 518 coupled to the bus 502. Communication interface 518 provides a two-way data communication channel with a computer network, such as network 130 in FIG. 1, which provides connectivity to and among the various servers discussed above. For example, communication interface 518 may be a local area network (LAN) card to provide a data communication connection to a compatible LAN, which itself is communicatively coupled to the Internet through one or more Internet service provider networks. The precise details of such communication paths are not critical to the present invention. What is important is that computer system 500 can send and receive messages and data through the communication interface 518 and in that way communication with hosts accessible via the Internet.

The various databases described herein are computer-based record keeping systems. Stated differently, these databases are each a combination of computer hardware and software that act together to allow for the storage and retrieval of information (data). Accordingly, they may resemble computer system 500, and are often characterized by having storage mediums capable of accommodating significant amounts of information.

Figure 5B:
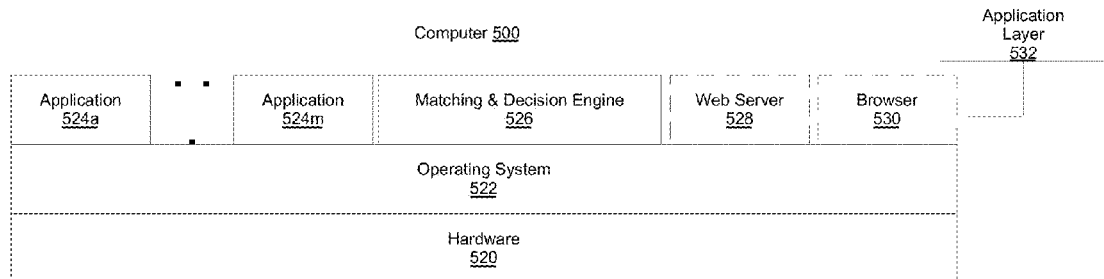
FIG. 5B illustrates a software architecture for various ones of the computer systems illustrated in FIG. 1.

FIG. 5B illustrates a computer system 500 from the point of view of its software architecture. Computer system 500 may be server 120 referred to above or, with appropriate applications comprising a software application layer 532, may be a client system or one of the host servers for a takeoff and/or landing site.

The various hardware components of computer system 500 are represented as a hardware layer 520. An operating system 522 abstracts the hardware layer and acts as a host for various applications 524*a*-524*m*, that run on computer system 500. In the case of server 120, the operating system acts as a host for a matching and decision engine 526, which is configured to perform the processes described above (e.g., to provide creative selections and insertions or other actions). For a server 102 and/or 108, the operating system may host a web server application 528, which provides access from the client computers via web browsers. Such a web server may also be hosted on server 120 to provide an interface by which the host servers 102 and 108 may communicate with server 120. In the case of a client system, the operating system acts as a host for a Web browser application 532, but not a matching and decision engine or (typically) a web server.

As alluded to above, network 130 may include the Internet and the various servers and client computers communicatively coupled thereto may include computer systems, such as computer system 500, that are made up of one or more processors, associated memory (typically volatile and non-volatile) and other storage devices and peripherals that allow for connection to the Internet or other networks. The precise hardware configuration of the hosting and client resources is generally not critical to the present invention, nor are the precise algorithms used to implement the services and methods described herein. Instead, the focus is on the nature of the services provided by the present invention.

Thus, methods and systems for recognizing intentions of a user as expressed in an on-line conversation or similar environment, and subsequently acting upon same, for example by bringing relevant or related content to the attention of the user and/or making others aware of the conversation, have been described. The present invention uses both intention type and topic to determine candidate creatives (and/or other actions) and evaluates those candidates according to an assessment of the actionability of the intention in order to determine which (if any) should be returned to the participants in the conversation. This process can also take into account various factors such as campaign management requirements (e.g., creative exposure limits) and conversational statistics to decide whether to place a creative or which creative to deliver. Further, determining which, if any, of the creatives to be displayed may include information about the devices on which the creative may be displayed. For example, screen size limit or text string length limit may be considered.

In various embodiments of the invention, the decision process may also incorporate learning based on past experiences with the creatives. For example, user interaction with previous instances of the creatives when inserted into takeoff pages may be tracked and used when deciding which, if any, creatives to provide for insertion. Moreover, such experience may be used in the matching process when deciding which introductions, calls to action and other components to combine with one another to form a creative. Likewise, past experience with creative placement within a takeoff page may be monitored and used to aid the decision about when to insert a creative in a takeoff page. Further, features or metrics regarding the conversation, such as conversational velocity, may be monitored and used as a guide for deciding whether and when to insert creatives. Such functions may be incorporated in the matching and decision engine, as appropriate.

Of course, the present invention is not limited to being used in conjunction with the insertion of creatives into on-line conversations. In various embodiments, the present systems and methods may be employed to alert others (e.g., those not currently engaged in the on-line conversation) to the existence and/or content of the conversation (e.g., as an enticement to join the conversation, to take action with respect to the conversation, to monitor or moderate the conversation, etc.). Further, intention type and topic as determined by the present methods and systems may be used to create, augment, inform or otherwise include or interact with one or more user profiles. Such profiles may be fashioned over a period of time in order to develop a more complete understanding of a particular user, which understanding may be used to determine which advertisements to present to the user and when to present them, etc.

In the foregoing discussion, the focus has been on creating links to guide users from conversational content to curated content, but in general the present methods and systems may be employed to create and insert links between any content of different modes. So, for example, the present methods and systems can be used to deliver curated content to sites hosting conversational content. In this regard, curated content can be regarded broadly as any content under editorial control of a site operator, or even profiles of individuals (e.g., Web-based biographies or profiles commonly associated with social networking sites or service provider sites). For example, links to such profiles may be used to suggest certain people (e.g., a subject matter expert) to join a conversation or answer a question, or even the reverse, e.g., suggest that a person join a particular conversation because he/she would provide information of value to that conversation. Thus, the referral process afforded by the present invention operates in a direction from conversation to curated (a takeoff page hosting conversational content to a landing page hosting curated content), or vice-versa. Indeed, one could use the present methods for mapping conversations to conversations, for example across on-line communities.

Given the various instances in which the present systems and methods find application, it should be recognized that the examples presented in the foregoing description were provided merely for purposes of illustration and should not be read as unduly limiting the present invention.

What is claimed is:

1. A computer-implemented method, comprising:
   in response to user generated content (UGC) presented as a textual posting via a network-enabled social media platform, determining, by a matching and decision engine of a processor-based system, an intention type and intention topic of an utterance contained within the UGC;
   on the basis of the intention type and intention topic, selecting from among a plurality of possible actions, one or more possible actions to be taken;
   scoring, according to an assessment of actionability of the intention topic, the one or more possible actions to be taken; and
   taking or not taking one or more of the possible actions according to respective scores therefor, wherein the one or more possible actions to be taken comprise one or more of presenting candidate creatives via the social media platform at which the UGC was posted, informing one or more others of the UGC, and creating or updating a user profile to account for the intention type and topic.

2. The method of claim 1, wherein the intention type is identified on the basis of features extracted from the utterance.

3. The method of claim 2, wherein the intention topic is identified on the basis of scored n-grams obtained from the utterance.

4. The method of claim 3, wherein the n-grams obtained from the utterance are scored using rules applicable to the identified intention type.

5. The method of claim 1, further comprising generating tagged n-grams from a tokenized representation of the UGC to produce a feature vector representative of the UGC and classifying the tagged n-grams to determine the intention type.

6. The method of claim 5, wherein the intention topic is identified on the basis of scored ones of the n-grams.

7. A computer-implemented method for determining an actionable intention from user generated content (UGC) presented as a textual posting via a network-enabled social media platform and selecting one or more creatives in response thereto, the method comprising:
    receiving the UGC at a computer processor-based system, and segmenting the UGC into utterances;
    for each subject utterance,
        extracting features of the subject utterance to produce a feature vector;
        classifying the feature vector to produce an intention type of the subject utterance;
        determining an intention topic of the subject utterance;
        determining candidate creatives for responding to the UGC according to the intention type and intention topic;
        scoring the candidate creatives according to a determined actionability of the UGC; and
        delivering one or more of the candidate creatives, the one or more selected according to their respective scores, to a user associated with the UGC.

8. The method of claim 7, wherein the utterances are determined and segmented according to punctuation marks.

9. The method of claim 7, wherein the utterances include some or all of questions, assertions, complaints, and requests for action.

10. The method of claim 7, wherein the utterances are represented using a bag of words model, each position in the feature vector is associated with a word token and a value at a given position in the feature vector represents an importance of the associated word token within the subject utterance.

11. The method of claim 10, wherein importance of the associated word token is measured according to a number of times that the word token appears in the subject utterance.

12. The method of claim 10, wherein importance of the associated word token is measured according to an inverse of a rate of occurrence of the word token across all instances in the UGC.

13. The method of claim 7, wherein when generating the feature vector of the subject utterance, words within a title of the UGC are weighted more strongly than words occurring in a body of the UGC.

14. The method of claim 7, wherein the intention topic is determined using a linguistics-based approach to identify key noun phrases in the subject utterance.

15. The method of claim 7, wherein the intention topic is determined by tagging parts of speech elements in the subject utterance, analyzing the subject utterance for n-grams, and using identified n-grams as candidate intention topics.

16. The method of claim 15, wherein the n-grams are determined without considering the intention type.

17. The method of claim 16, further comprising scoring the candidate intention topics according to the intention type and determining on the basis of the scores a most likely intention topic for the subject utterance.

18. A server, comprising a processor and a computer-readable storage device communicatively coupled to the processor, the computer-readable storage device storing computer-readable instructions, which when executed by the processor cause the processor to:
    determine, in response to user generated content (UGC) presented as a textual posting via a network-enabled social media platform, an intention type and intention topic of an utterance contained within the UGC;
    select, on the basis of the intention type and intention topic and from among a plurality of possible actions, one or more possible actions to be taken;
    score, according to an assessment of actionability of the intention topic, the one or more possible actions to be taken; and
    take or not take one or more of the possible actions according to respective scores therefor, wherein the one or more possible actions to be taken comprise one or more of: presenting candidate creatives via the social media platform at which the UGC was posted, informing one or more others of the UGS, and updating a user profile to account for the intention type and topic.

19. The server of claim 18, wherein the intention type is identified on the basis of features extracted from the utterance.

20. The server of claim 18, wherein the intention topic is identified on the basis of scored n-grams obtained from the utterance.

21. The server of claim 20, wherein the n-grams obtained from the utterance are scored using rules applicable to the identified intention type.

22. The server of claim 18, further comprising generating tagged n-grams from a tokenized representation of the UGC to produce a feature vector representative of the UGC and classifying the tagged n-grams to determine the intention type.

23. The server of claim 22, wherein the intention topic is identified on the basis of scored ones of the n-grams.

* * * * *